(12) United States Patent
Muellner

(10) Patent No.: US 7,891,104 B2
(45) Date of Patent: Feb. 22, 2011

(54) METHOD AND AN ENGAGEMENT SENSOR DEVICE FOR ENGAGEMENT MEASUREMENT FOR A MACHINE TOOL

(75) Inventor: Ralf Muellner, Ostfildern (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 274 days.

(21) Appl. No.: 12/286,052

(22) Filed: Sep. 26, 2008

(65) Prior Publication Data
US 2009/0100695 A1    Apr. 23, 2009

(30) Foreign Application Priority Data
Oct. 19, 2007    (DE) .................. 10 2007 050 111

(51) Int. Cl.
*G01B 5/24* (2006.01)
(52) U.S. Cl. ....................... 33/412; 33/366.11
(58) Field of Classification Search ............... 33/412, 33/645, DIG. 1, 366.11
See application file for complete search history.

(56) References Cited

U.S. PATENT DOCUMENTS 5,077,905 A * 1/1992 Murray, Jr. .................. 33/412
7,111,407 B2 * 9/2006 Jones ....................... 33/366.12

FOREIGN PATENT DOCUMENTS

DE            264 625 A1      2/1989

* cited by examiner

*Primary Examiner*—G. Bradley Bennett
*Assistant Examiner*—Tania C Courson
(74) *Attorney, Agent, or Firm*—Flynn, Thiel, Boutell & Tanis, P.C.

(57) ABSTRACT

In a method and an engagement sensor device for engagement measurement for a machine tool for processing workpieces using tools or a laser the machine tool possesses a clamping device with a clamping face for clamping an object, in particular a tool or a workpiece and the engagement sensor device is provided for the measurement or engagement of a face of clamped object at the clamping face or any gap between the face of the clamped object and the clamping face. The sensor device comprises at least one engagement sensor, arranged to the side of the clamping face, with a measurement range aligned in the direction of the gap or of the clamping face for the detection of an electrical or magnetic stimulation field, such field extending between the face of clamped object and the clamping face and being able to be influenced by any gap, the measurement range extending essentially along the clamping face in accordance with a depth direction of any gap or parallel to the clamping face.

22 Claims, 4 Drawing Sheets

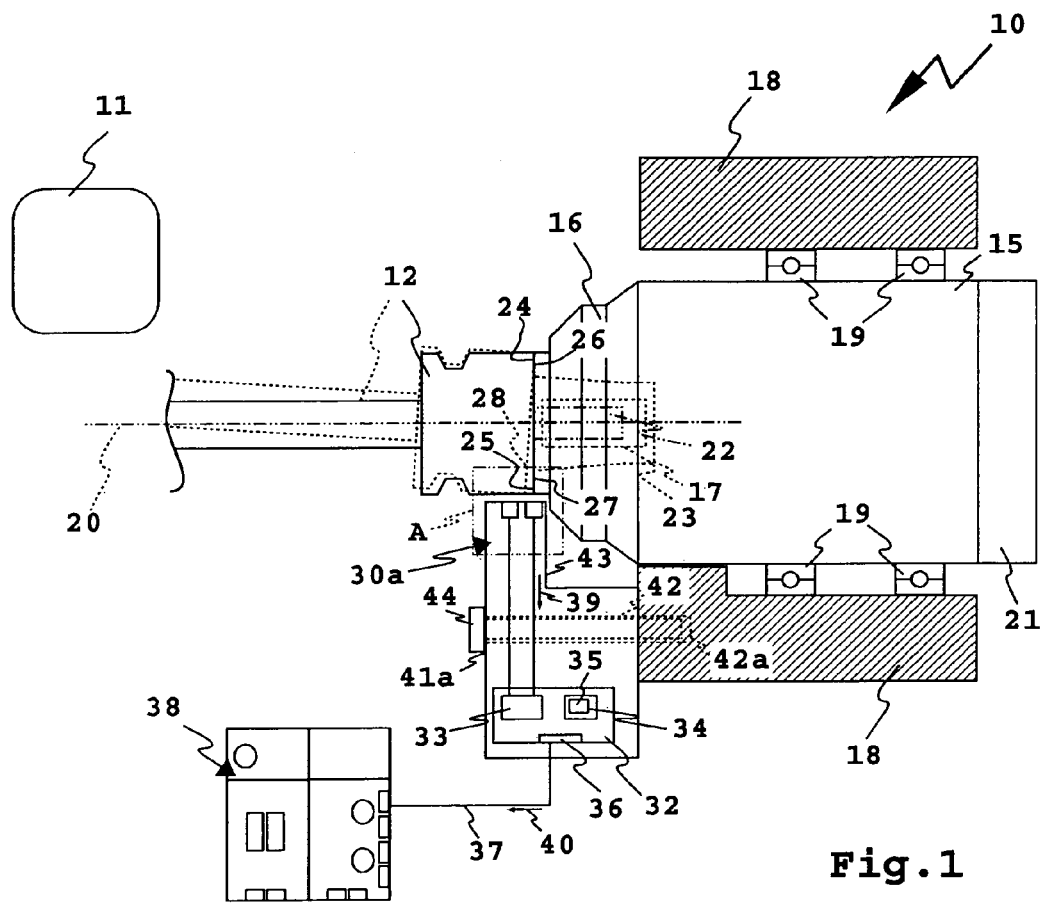
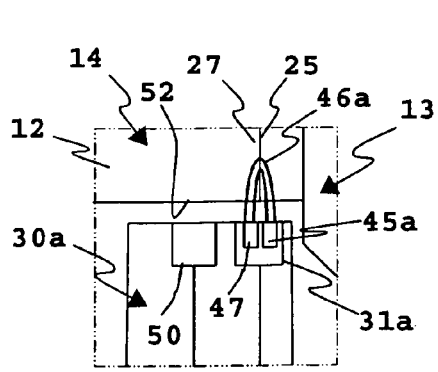 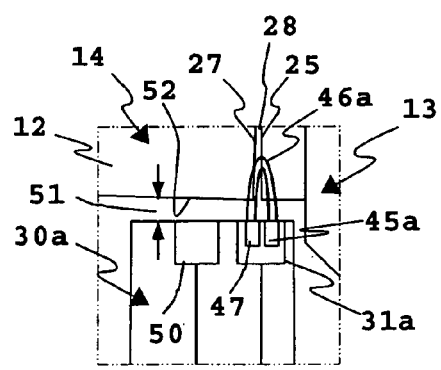
Fig.1
Fig.2a  Fig.2b

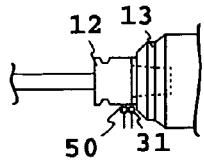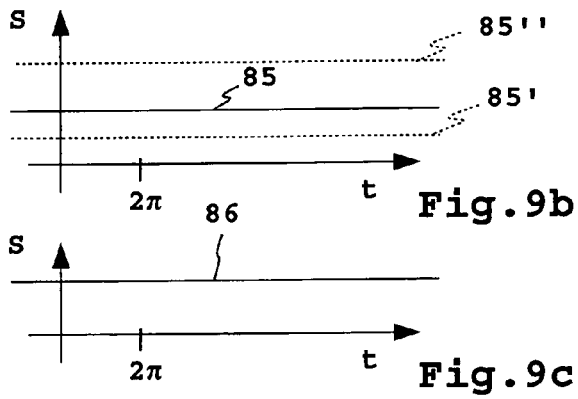
Fig.9a  Fig.9b  Fig.9c
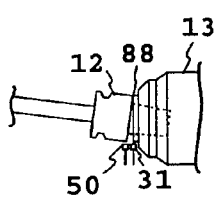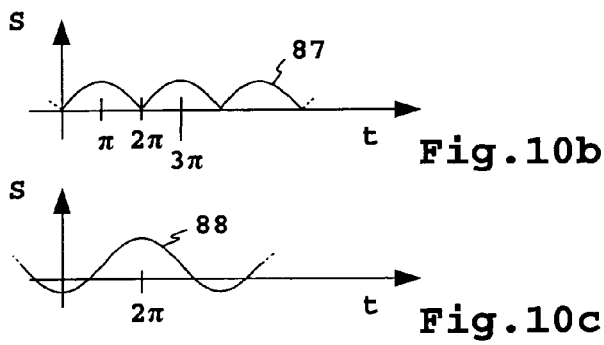
Fig.10a  Fig.10b  Fig.10c
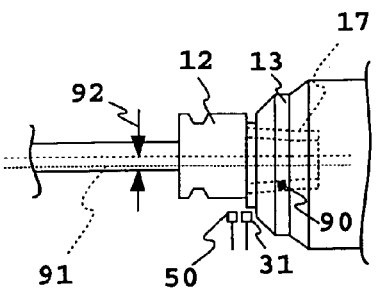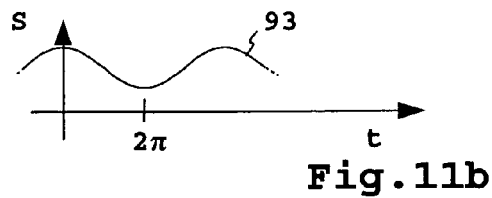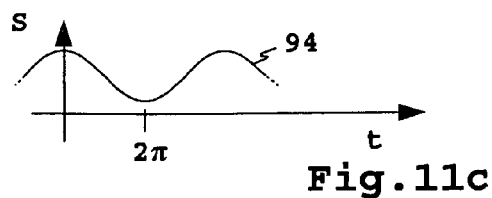
Fig.11a  Fig.11b  Fig.11c

METHOD AND AN ENGAGEMENT SENSOR DEVICE FOR ENGAGEMENT MEASUREMENT FOR A MACHINE TOOL

BACKGROUND OF THE INVENTION

The invention relates to a method and an engagement sensor device for engagement measurement for a machine tool for processing workpieces using tools or a laser, in the case of which the machine tool possesses a clamping device with a clamping face for clamping an object, in particular a tool or a workpiece and the engagement sensor device is provided for the measurement or engagement of a face of the clamped object at the clamping face or any gap between the face of the clamped object and the clamping face.

The machine tool is for example a milling or drilling machine or a lathe, which machines the workpiece by chip removal.

THE PRIOR ART

A machine tool with a sensor device for measurement of engagement of a clamped object, as for example a workpiece, is disclosed in the German patent publication DD 264 625 A1. By the application of a workpiece to planar engagement elements the latter are short circuited. The planar engagement elements are arranged on a spindle. Signal responsive induction coils of the spindle housing detect changes in the signal.

A disadvantage in this arrangement is that the planar engagement sensor is arranged on the moving spindle rotor so that the transmission of the evaluation signal is relatively complex. Furthermore the planar engagement sensors are relatively difficult to replace. It is necessary for moving parts of the machine tool to be dismounted before the planar engagement elements or, respectively, the planar engagement sensors may be replaced.

SHORT SUMMARY OF THE INVENTION

One object of the present invention is to provide for improved engagement measurement in the case of machine tools.

In order to achieve this aim in the case of an engagement sensor device of the type initially mentioned there is a provision such that it possesses at least one engagement sensor, arranged to the side of the clamping face, with a measurement range aligned in the direction of the gap or of the clamping face for the detection of an electrical or magnetic stimulation field, such field extending between the face of clamped object and the clamping face and being able to be influenced by any gap, the measurement range extending essentially along the clamping face in accordance with a depth direction of any gap or parallel to the clamping face. In order to achieve the aim the invention furthermore provides a method in accordance with technical principle of a further independent claim.

The engagement can for example be a planar engagement of the face of clamped object on the clamping face. The engagement sensor device may then be termed a planar position sensor device or a planar engagement sensor device.

The machine tool is for example a laser machine tool and/or a machine tool for workpiece processing by chip removal, as for example a milling machine and/or a drilling machine and/or a lathe.

One advantage of this arrangement is that the sensor may for example be arranged in a stationary manner. Accordingly its wear rate is low and it is furthermore readily replaced. Furthermore the sensor is not subject to external forces and only measures into any gap present.

A basic principle of the invention is that air is present between the owing to the gap, which is present between the clamped object, for example a tool or a workpiece, and the clamping face and such air influences the electrical or magnetic stimulation field. For example air possesses a different dielectric coefficient than clamped object, for example of metal, or respectively the clamping device at the clamping face. Moreover, the magnetic flux in an air gap is different than of the case of engagement or a planar setting with a planar engagement of the object on the clamping face. Dependent on the engagement/planar setting or, respectively, the gap between the clamping face and the clamped object a depth of penetration of the electrical and/or magnetic stimulation field generator will vary.

Preferably the clamping face is an flat face. The at least one engagement sensor is preferably arranged in the plane of the clamping face or is parallel to it, and for example the engagement sensor will directly measure into any gap present between the clamped object and the clamping face.

The engagement sensor is preferably a contact-free capacitive or inductive distance sensor.

The clamping device is preferably able to be shifted in relation to the frame of the machine tool, and for example may be turned in relation to it. In this connection the invention is also particularly advantageous, since the sensor device may be arranged stationarily in relation to the movable clamping device. Accordingly the clamping device can be attached for example to a machine bed, to a holder or to a rotary support for the movable clamping device or the like. Thus the replacement of the sensor device is simplified.

It is however also possible for the sensor device to be placed on a sensor holder able to move independently from the clamping device. In this respect it is possible for the clamping device to be movable or stationary. For example the sensor device can be shifted with the movable sensor holder for measurement toward the clamping device and following the measurement may be shifted back away from it again.

A stationary sensor device does however bring the advantage that for example a tool change or a workpiece change may take place more rapidly.

The sensor device is best designed for generating an engagement signal, which indicates engagement or the presence of a gap between the clamped object and the clamping face on the basis of a reference distance measurement of a reference standard between the sensor device and part of the outline in the clamped object adjacent to the clamping face. The outline is for example an outer peripheral outline, more particularly when the clamping device is a spindle or a component of a spindle. The reference signal renders it possible for example to compensate for a distance by a measurement technique, which is due to differently designed clamped objects, as for example tools or workpieces with a greater or smaller diameter.

For example the engagement sensor has a measurement range able to be switched between an engagement setting for engagement measurement and a reference setting for measurement of the reference distance. Thus the engagement sensor may be kept stationary for example. It is nevertheless also possible for a separate reference sensor to be provided for reference distance measurement for the sensor device. The reference sensor is for example at an axial and/or radial distance from an axis of rotation or other movement direction of the clamping device.

Furthermore a movable sensor holder is possible for resetting the engagement sensor between a reference measurement position for the reference distance measurement and an engagement position for engagement measurement. For example the sensor holder can swing the at least one engagement sensor between the reference measurement position and the engagement measurement position. A linear method is possible as well.

The clamping device will preferably comprise a spindle, as for example a tool or spindle. It is more particularly advantageous to use the invention in conjunction with hollow shank taper (HST) systems or short taper clamping systems.

The clamping face is for example the end face of a rotor of the spindle. The measurement range of the engagement sensor extends athwart, to an axis of rotation of the spindle, or example or obliquely to it.

The sensor device is preferably disposed on a spindle holder, which is a bearing for the spindle rotor, or on a frame holding the spindle. Accordingly the sensor device remains stationary, while the spindle rotor is rotatable. The sensor holder has for example an arm projecting from the clamping face and more particularly from the spindle rotor. Moreover, it is possible for the sensor holder to have a through opening so that for example a torque support or the like may be plugged right through the sensor holder and be united with the spindle holder, f. i. by being screwed to it.

The sensor device preferably possesses an evaluating means for the generation of an engagement signal, which is produced by the evaluation means on the basis of engagement data of the engagement sensor. It will be clear that the evaluating means may also be a spaced means, and for example constitute a component of a control of the machine tool. The evaluating means may for example be a program module with program code, which is able to be implemented by the control of the machine tool.

The evaluating means is preferably designed to detect a movement, as for example a rotation or a linear movement, of the clamping device. This is more particularly advantageous in conjunction with the reference measurement. Thus for example the so-called reference distance may be influenced by an outline (f. i. a radial runout of the clamped object) which extends unevenly with reference to the direction of movement of the clamped object and/or the clamping device, this then being detected by the evaluating means and being taken into account in the generation of the engagement signal.

The evaluating means is best designed for the detection of an engagement of the clamped object's face on the clamping face in at least two measurement positions. For instance the sensor device is moved along the clamping face or the clamping face is shifted past the sensor device and for example is turned. Accordingly therefore for detection of the measurement positions the clamping device is moved in relation to the sensor device or vice versa the sensor device is shifted in relation to the clamping device.

For the production of the stimulation field, i. e. the electrical or magnetic field, a stimulation field generator is provided, which for example can be arranged on the clamped object, the clamping device or the sensor device. In the latter case the stimulation field generator is designed in the form of a separate means of the sensor device, for example as an induction coil. It is however also advantageous for the stimulation field generator to constitute a component of the at least one engagement sensor.

The sensor device may however also comprise several engagement sensors disposed along a common outline which is defined by the clamped object and the clamping device. The outline is for example an outer periphery of a tool or workpiece spindle and of the workpiece or tool clamped by same in position. The outline may be stepped.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 1 represents a partial side view of a machine tool in accordance with the invention with an engagement sensor device.

FIG. 2a shows a portion A taken from FIG. 1, a clamped object being in engagement with a clamping device of the machine tool.

FIG. 2b is a view similar to FIG. 2a in which a gap is present between the clamped object and a clamping face of the clamping device.

FIG. 7a shows a fourth working embodiment of a sensor device of a reference distance measurement generally in accordance with the portion A in FIG. 2a.

FIG. 9a shows the machine tool according to FIG. 1, the clamped object engaging the clamping face in a planar manner.

FIG. 9b shows a signal from the engagement sensor.

FIG. 9c shows a signal from the associated reference sensor of the sensor device in accordance with FIG. 1.

FIG. 10a is a view corresponding to FIG. 9a, in the case of which there is a terminal gap between the clamped object and the clamping device.

FIG. 10b shows a signal of the engagement sensor.

FIG. 10c shows a signal of the reference sensor in the case of the configuration according to FIG. 10a.

FIG. 11a is a view similar to FIG. 9a, there being a radial offset between the clamped object and the clamping device.

FIG. 11b shows a signal from the engagement sensor.

FIG. 11c shows a signal from the reference sensor in the case of the arrangement of FIG. 11a.

DETAILED ACCOUNT OF WORKING EMBODIMENTS OF THE INVENTION

Figure 3:
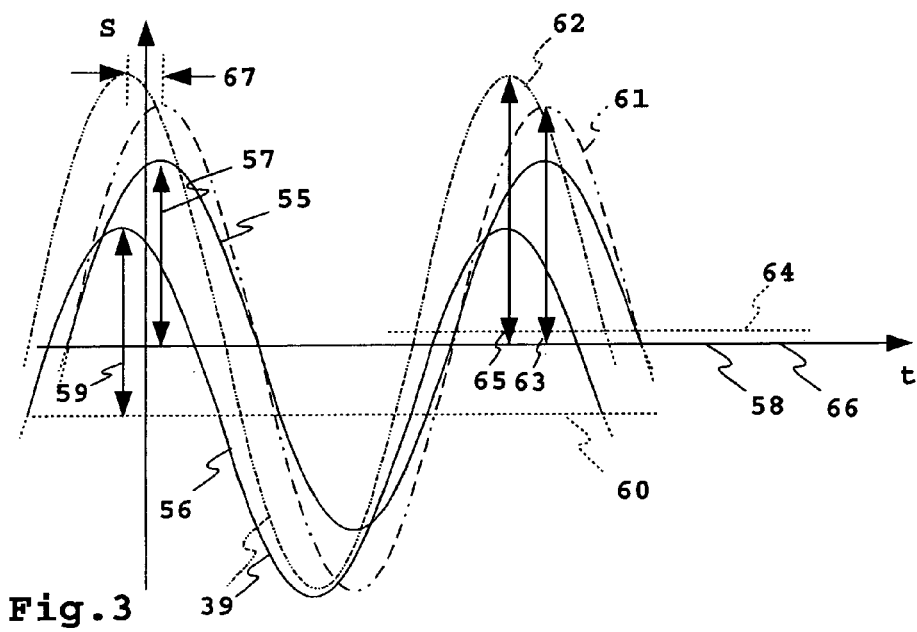
FIG. 3 shows the progression of reference distance values of a reference distance sensor and engagement values of an engagement sensor of the sensor device in accordance with FIG. 1 on engagement and in the case of a small gap between the clamped object and the clamping face.

In the following description of working examples similar or functionally equivalent component are provided with the same reference numerals.

A machine tool 10 only illustrated diagrammatically in part serves for processing workpieces 11, which are also only indicated diagrammatically, as for example castings or other metal parts, by means of tools 12. The tool 12 is a tool for chip removal as for example a milling cutter or a lathe tool. The tool 12 constitutes a clamped object 14, which is held by a clamping device 13 of the machine tool 10. The clamping device 13 is provided on a spindle rotor 16 of a spindle 15. The tool 12 is inserted into a tool socket 17 in the spindle 15 and held fast in it.

The spindle rotor 16 is rotatably mounted on a spindle holder 18 with the aid of a spindle bearings 19 for rotation about an axis 20 of rotation 20. The spindle 15 is driven by a motor 21.

The shank 22 of the tool 12 is clamped in a tool holder 23 of the clamping device 13. The tool holder 23 is a so-called hollow shank taper (HST) socket. The tool holder 23 clamps a face 27 of the clamped object at a terminal side 6 of the clamped object 14 against clamping faces 25 at the terminal side 24 of the spindle 15. The clamping faces 25 are arranged on the terminal side 24 like circular segments, there being a set back terminal face 29 of the terminal side 24 between each two respective clamping faces 25. The clamping faces 25 are disposed at the terminal side 24 along a circle. The face 27 of the clamped object 27 is a planar face of the tool 12, which ideally is in planar contact with the clamping faces 25.

It would admittedly be possible in principle to sense the engagement of the face 27 of the clamped object on the clamping faces 25 using conventional sensors, for example with the aid of sensors disposed on the clamping faces 25. The same however would rotate during operation of the spindle 15 so that the transmission of measured values or data would be difficult. Accordingly in the case of the machine tool 10 a different principle is adopted in which a sensor device 30 monitors the engagement of the face 27 of the clamped object on one or more clamping faces 25. Failing such an engagement, for example a planar engagement, i. e. for example in the case of a skew position of the tool 12 in relation to the axis 20 of rotation with a gap 28 between the face 27 of the clamped object and a respective clamping face 25, such gap will be found by the sensor device 30a.

The sensor device 30a is stationary and does not rotate with the spindle 15. The sensor device 30a has an engagement sensor 31a for detection of engagement or the presence of a gap 28 at the side 27 of the clamped object at one or more clamping faces 25. An evaluating means 32 detects, on the basis of the engagement measured values or data 39 from the engagement sensor 31a, whether there is engagement or a gap 28 and on the basis of the engagement data 39 sends an engagement signals 40 to a control 38 of the machine tool 10.

A processor 33 of the evaluating means 32 processes the engagement data 39 with the aid of an evaluating program module 35, which is held in a memory of the evaluating means 32 and comprises program code able to be implemented by the processor 33. A line 37 between the evaluating means 32 and the control 38 is connected with a transmission/reception interface 36 of the evaluating means 32. It will be apparent that a wireless transmission of the engagement signal 40 is also possible.

The sensor device 30 is stationary in relation to the spindle 15. The engagement sensor 31a and also the further components 33, 34 and 36 are arranged in a sensor holder 41a having a housing or being designed in the form of a housing, of the sensor device 30a. The sensor holder 41a is attached to the spindle holder 18, for example with a screw 44 extending through a hole 42 in the socket 42a on the spindle holder 18. The screw socket 42a serves as such to receive a torque support (not illustrated). The hole 42 renders it possible for such a torque support nevertheless to be attached to the spindle 15, for example with a longer screw (not illustrated) instead of the relatively short screw 44.

The engagement sensor 31a and also a reference sensor 50 are disposed in an arm 43 of the sensor holder 41a, which extends radially inward toward the axis 20 of rotation to a common outline 53 of the clamped object 14 and the clamping device 13. Accordingly it is possible to arrange the sensor device 30a on an already existing clamping device 13 to upgrade it and to detect engagement of the clamped object 14 with the clamping face 25.

The engagement sensor 31a is arranged in an axial position in relation to the axis 20 of rotation, where a gap 28 might be present. This is for example then the case, when the tool 12 is braced obliquely in relation to the axis 20 of rotation in the tool socket 17 (indicated in the drawing in chained lines). The engagement sensor 31a measures as it were into any gap 28 present for engagement measurement. In accordance with the principle of the invention the engagement sensor 31a in this case measures a stimulation field 46a produced by a stimulation field generator 45a, such field extending right through the gap 28 or, respectively, into the gap 28. The stimulation field generator 45a for example produces a magnetic or electrical stimulation field, which is detected by a receiver 47 of the engagement sensor 31a. The stimulation field generator 45a is a component of the engagement sensor 31a.

In accordance with the invention the principle has been recognized that on engagement of the face 27 of the clamped object with at least one clamping face 25 a stimulation field 46a is produced different to the field in the case of no engagement (FIG. 2b), in the case of which a gap 28 containing the air exists between the clamping face 25 and the face 27 of the clamped object. The extent of the stimulation field generator 46a, more particularly in the axial direction in relation to the axis 20 of turning, i. e. athwart the longitudinal or depth extent of the gap 28, is for example influenced by a different dielectric constant of the air in the gap 28 or an altered magnetic flux in the gap 28.

The reference sensor 50 measures a reference distance 51 between the sensor device 30a and an outline 52 of the clamped object 10 adjacent to the clamping face 25. Thus for example it is possible to utilize tools 12 with different diameters, there then being a different reference distance 51.

The reference sensor 50 produces reference distance values 55 taken into account for the production of the engagement signal 40. The progressions of the engagement measured values 39 on the one hand during engagement and on the other hand without engagement are for example indicated in FIG. 3.

During each respective measurement the spindle 15 is turned at least through part of a rotation. Then there are for example sinusoidal reference distance values 55 due to a so-called radial wobble of the clamped object 14 from the sensor device 30a. The reference distance values 55 vary at a reference distance amplitude 57 sinusoidally about a reference level 58.

When—in a manner different to the measurement illustrated—there is no radial wobble or runout the reference distances are constant so that for example they have the same amplitude S along the time axis t and for example remain constantly at the same reference distance level 58.

Figure 8:
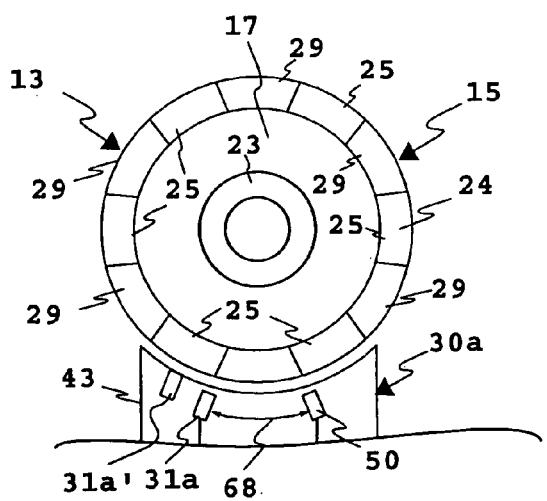
FIG. 8 is a partial front view of the clamping device and of the sensor device as in FIG. 1 to illustrate an angular offset between a reference distance sensor and the engagement sensor.

In a manner corresponding to the sinusoidal reference distance values 55 the engagement measurements 56 also progress, which are produced by the engagement sensor 31a. The engagement measurement values 56 on engagement oscillate sinusoidally with an engagement amplitude 59 about an engagement level 60. Between the reference distance values 55 and the engagement measurement values 56 there is a phase offset 67, which owing to a distance in the angle of rotation 68 is present between the reference sensor 50 and the engagement sensor 31a (FIG. 8). During engagement there is for example a distance in level between the engagement measured values 56 and the reference distance values 55. This naturally is dependent however on the matching of the engagement sensor and of the reference sensor 50 i. e. may be set differently from case to case.

In the absence of an engagement or of planar engagement, that is to say with the existence of a gap 28, the relationships are changed. The reference sensor 50 produces then reference distance values 61, which have a larger reference distance amplitude 63 than the reference distance values 55 and furthermore a somewhat changed reference distance level 64. Owing to the oblique setting (in chained lines in FIG. 1) of the tool 12 in relation to the spindle 15 the radial wobble of the tool 12 will vary, something meaning a greater reference distance amplitude 63. Furthermore the engagement measured values 62, which are produced by the engagement sensor 31a in the case of lack of engagement or respectively the presence of a gap 28, have a greater engagement amplitude 65 and more especially an altered engagement level 66.

The evaluating means 32 may now detect, even owing to the presence of the changed engagement amplitude 65, a lack engagement as compared with the engagement measured values 56. The engagement amplitude 65 and the engagement amplitude 59 may be taken as a measure for the width of the gap 28, i. e. a distance between face 27 of the clamped object and the clamping face 25. The evaluating means 32 represents, preferably in the engagement signal 40, a measure for the width of the gap 28. It will be clear that the engagement signal 40 may also merely distinguish between engagement and non-engagement.

The engagement signal 40 may be an analog signal or a digital signal.

Preferably the evaluating means 12 takes into account the reference distance values 55 and 61 in the formation of the engagement signal 40. Thus the evaluating program module 35 may for example be designed to form the difference between the engagement measured values or data 56 and 62 and the reference distance values 55 and 61 for the formation of the engagement signal 40. Naturally the engagement measured values 56 and 62 and/or the reference distance values 55 and 61 may be made subject to a weighting factor before the formation of this difference signal.

Figure 4:
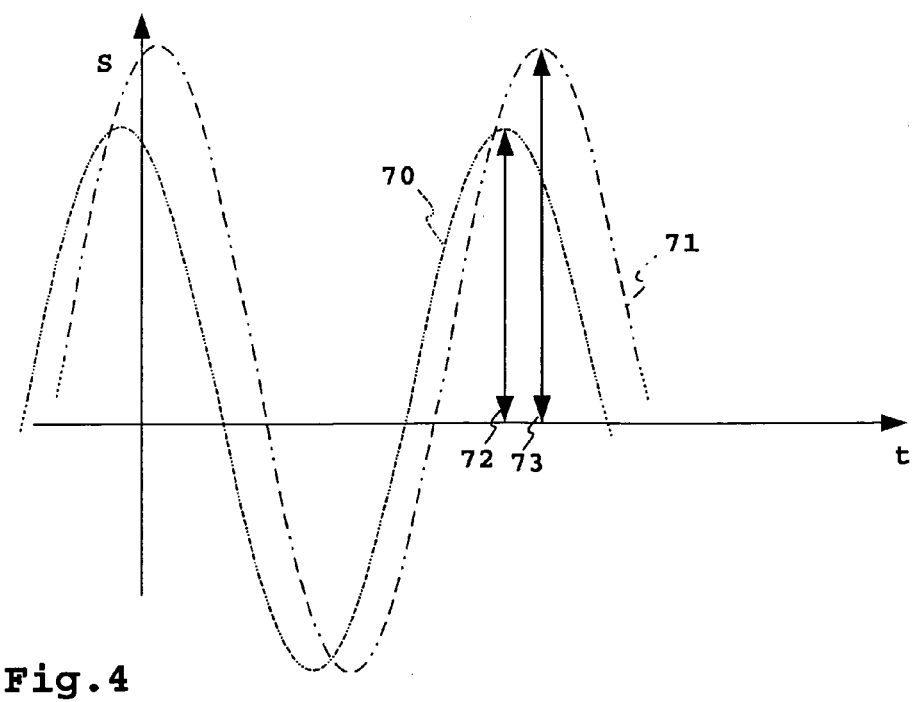
FIG. 4 shows the signal in accordance with FIG. 3 but however in the case of a larger gap between the clamped object and the clamping face.
Figure 5:
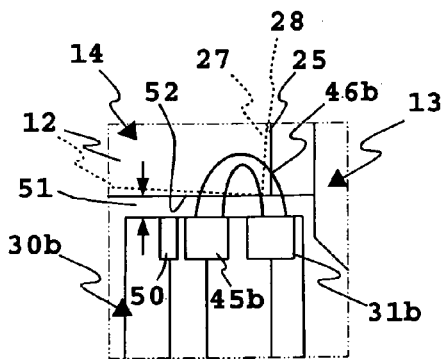
FIG. 5 is a partial view like the portion A of FIG. 2a of a second embodiment of a sensor device in accordance with the invention having an engagement sensor and a stimulation field generator disposed in the sensor device.

In FIG. 4 the situation is represented with an even larger gap 28. The reference distance values 70 of the reference sensor 50 have, as compared with the reference distance amplitudes 57 and 63, a substantially larger reference distance amplitude 72. Furthermore an engagement amplitude 73 of the engagement measured values 71 is essentially larger than the engagement amplitudes 59 and 63. It will be quite clear that an even more oblique setting of the tool 12 in relation to the axis of rotation 20 will exert an influence both on the reference distance measured values 70 and also more particularly on the engagement measured values 71. It is here that the principle of the invention is more especially relevant because namely the engagement sensor 31a is responsive to the greater influence of the enlarged air gap 28, since the engagement sensor 31a measures as it were into the air very gap 28 itself and respectively detects the stimulation field 46a active here.

This principle is also employed in the working examples illustrated in the FIGS. 5, 6, 7a and 7b.

A sensor device 31b possesses a stimulation field generator 45b, which is separate from an engagement sensor 31b. The stimulation field generator 45b produces for example an electrical and/or magnetic stimulation field 46b, which extends past the clamped object 14, which preferably consists of metal, into any air gap 28 between the face 27 of the clamped object and the clamping face 25. The engagement sensor 31b is as it were only a receiver for the stimulation field generator 46b.

Figure 6:
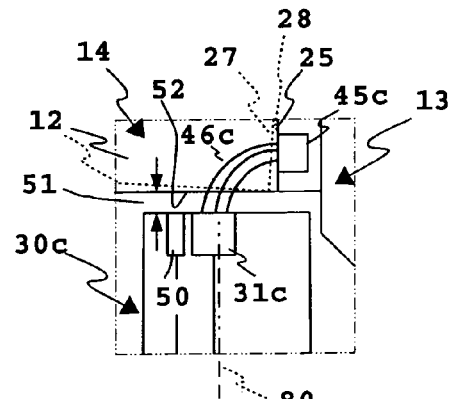
FIG. 6 represents a portion corresponding to the portion A of FIG. 2a of a third working embodiment of a sensor device in accordance with the invention with a stimulation field generator, which is arranged in the clamping device and produces a stimulation field for an engagement sensor of the sensor device.

Furthermore it would be possible to place a stimulation field generator in the clamped object or the clamping device, something which is represented in FIG. 6. A stimulation field generator 45c is arranged near the clamping face 25 on the clamping device 13. The stimulation field generator 45c is for example a magnet, which generates the stimulation field 45c. The latter is detected by an engagement sensor 31c. The clamped object 14 conducts the stimulation field 46c to the engagement sensor 31c. The engagement sensor 31c is not disposed near a possible gap 28 but parallel to it in a plane 80 parallel to the clamping face 25.

Figure 7A:
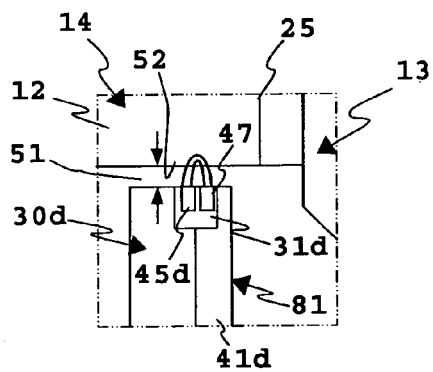
Figure 7B:
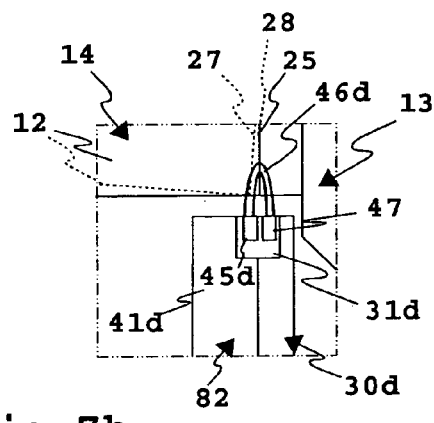
FIG. 7b shows the sensor device for engagement measurement in accordance with FIG. 7a but set in the direction of a gap between the clamped object and the clamping face.

In the case of a sensor device 30d depicted in FIGS. 7a and 7b only one engagement sensor 31d is present but there is no separate reference sensor. The engagement sensor 31d is adapted for engagement measurement and reference distance measurement. In this connection it is to be noted that although the reference distance measurement improves the quality of measurement of the engagement, it is not absolutely essential.

A sensor holder 41d of the sensor device 30d is able to be moved between a reference measurement position 81 for measurement of the reference distance 51 and an engagement measurement position 82 for measurement of the engagement of the face 27 of the clamped object on the clamping face 25, by being pivotally and/or, as in the working example, linearly movable. The engagement sensor 31d has a stimulation field generator 45d for the production of a stimulation field 46d. In the reference position 81 the engagement sensor 31d firstly measures the reference distance 51. Then the sensor holder 41d is shifted in the direction of the clamping face 25 so that the engagement sensor 31d assumes an axial position corresponding to any possible gap 28. Then the stimulation field 46d pervades the gap (FIG. 7b) and is influenced by any air present there. This is detected by the engagement sensor 31d.

Preferably the sensor holder 41 is able to be adjusted not only axially in relation to the axis 20 of rotation but also with a further degree of freedom so that it may be moved between the two measurement positions 81 and 82 on the one hand and a reserve position 83 spaced therefrom on the other hand. For each engagement measurement the sensor device 30d is shifted out of the reserve position 83 into the measurement positions 81 and 82 and after this back into the reserve position 83.

Furthermore it is possible to provide several engagement sensors along the common outline 52 defined by the clamped object 14 and the clamping device 13, for example in addition to the engagement sensor 31a an engagement sensor 31a' st at an angle.

The FIGS. 10 through 12 individually indicate once again how the different imperfections in engagement take effect in the machine tool 10 and are for example detected by the sensor means 30a.

In the case of such ideal engagement (FIG. 9a) the engagement sensor 31a and the reference sensor 50 (which is a sort of tool sensor) associated with the tool 12 and sensing its outline produce constant engagement values 85 and furthermore reference values 85. It will be clear that the amplitude of the engagement values 85 and of the reference values 86 will be dependent on a production tolerance, as for example of the respective sensors 31a and 50, on the tool 12 and on the clamping device 13 or the like. Accordingly for example instead of the engagement values 85 engagement values 85' or 85" are possible.

When a terminal engagement error or a terminal planar setting error is present, which in FIG. 10a is diagrammatically indicated, the engagement sensor 31a and the reference sensor 50 will produce engagement values 87 and reference values 88. In the case of angles of rotation of 0, 2 π, 4π and the like (0, 360 degrees, 720 degrees etc.) the engagement values 87 are for example respectively zero. This is because for example the tool 12 is in planar engagement with the end face 24 at the engagement point 88 so that the associated engagement value 87 are zero for example. Diametrally opposite the engagement point 89 on the other hand the gap is 28 at a maximum so that the engagement values 87 will have a respective maximum at the angular positions of π, 3 π etc.

An error in the outline, the presence of dirt 90 or the radially outer periphery of the part seated in the tool socket 17, of the clamped object 14 or respectively of the tool 12 will lead to a radial wobble of the clamped object 14 in relation to the clamping device 13 and in the working example a so-called cone engagement error. Thus for example an axis 91 of rotation has an offset 92 in relation to the axis 20 or rotation of the spindle 15. The engagement values 93 resulting from this of the engagement sensor 31a and the reference values 94 of the reference sensor 50 which are respectively approximately sinusoidal. The offset 92 between the axes 20 and 91 of rotation is indicated in an exaggerated fashion in FIG. 11a.

The technology provided by the invention renders it possible to find engagement errors on the basis of one measurement directed into any possible gap or respectively in the vicinity of a possible gap, which is present in the case of an engagement error and also higher order effects, i. e. for example an axial offset or a radial wobble like in the arrangement in accordance with FIG. 11a and/or a terminal engagement error like in FIG. 10a, same being able to be found as a higher order effect.

The invention claimed is:

1. An engagement sensor device for engagement measurement for a machine tool for processing workpieces using tools or a laser, in the case of which the machine tool possesses a clamping device with a clamping face for clamping an object, in particular a tool or a workpiece, and the engagement sensor device is provided for the measurement or engagement of a face of the clamped object at the clamping face or any gap between the face of the clamped object and the clamping face, comprising at least one engagement sensor, arranged to the side of the clamping face, with a measurement range aligned in the direction of the gap or of the clamping face for the detection of an electrical or magnetic stimulation field, such field extending between the face of clamped object and the clamping face and being able to be influenced by any gap, the measurement range extending essentially along the clamping face in accordance with a depth direction of any gap or parallel to the clamping face.

2. The engagement sensor device in accordance with claim 1, wherein the stimulation field extends athwart the clamping face and more particularly perpendicularly to it.

3. The engagement sensor device in accordance with claim 1, wherein the at least one engagement sensor is a contact-free capacitive or inductive distance sensor.

4. The engagement sensor device in accordance with claim 1, wherein the clamping device is able to be moved and more particularly turned in relation to a machine frame of the engagement sensor device.

5. The engagement sensor device in accordance with claim 1, wherein the clamping device is movable and wherein the sensor device is arranged in a stationary manner in relation to the movable clamping device.

6. The engagement sensor device in accordance with claim 1, wherein the sensor device is disposed on a sensor holder movable in a manner independent from the clamping device.

7. The engagement sensor device in accordance with claim 1, designed for producing an engagement signal on the basis of engagement measurement of the engagement of the clamped object face on the clamping face and on the basis of a reference distance measurement of a reference distance between the sensor device and an outline, extending adjacent to the clamping face, of the clamped object.

8. The engagement sensor device in accordance with claim 7, wherein the at least one engagement sensor possesses a measurement range able to be switched over between an engagement setting for the engagement measurement and a reference setting for reference distance measurement.

9. The engagement sensor device in accordance with claim 7, comprising a reference sensor for reference distance measurement.

10. The engagement sensor device in accordance with claim 7, wherein the movable sensor holder is provided for resetting the at least one engagement sensor between a reference measurement position for reference distance measurement and an engagement measurement position for reference distance measurement and an engagement measurement position for engagement measurement.

11. The engagement sensor device in accordance with claim 1, wherein the sensor device comprises an evaluating means for deriving a dependent engagement signal produced by the at least one engagement sensor.

12. The engagement sensor device in accordance with claim 11, wherein the evaluating means is adapted for detection of a movement and more particularly a rotation, of the clamping device.

13. The engagement sensor device in accordance with claim 11, wherein the evaluating means is designed for detecting engagement of the face of the clamped object on the clamping face at least two measurement positions.

14. The engagement sensor device in accordance with claim 1, comprising a stimulation field generator for producing the stimulation field, such generator being disposed in the clamped object and/or the clamping device and/or the sensor device.

15. The engagement sensor device in accordance with claim 14, wherein the stimulation field generator constitutes a component of the at least one engagement sensor.

16. The engagement sensor device in accordance with claim 15, comprising several engagement sensors arranged along a common outline defined by the clamped object and the clamping device.

17. A machine tool comprising an engagement sensor device in accordance with claim 1.

18. The machine tool in accordance with claim 17, wherein the clamping device comprises a spindle.

19. The machine tool in accordance with claim 18, wherein the clamping face is provided on a terminal side of a rotor of the spindle and wherein the measurement range of the at least one engagement sensor extends athwart the axis of rotation of the spindle and more especially radially thereto.

20. The machine tool in accordance with claim 18, wherein the sensor device is disposed on a spindle holder holding the spindle and more particularly rotatably supporting the spindle rotor.

21. A method for engagement measurement in a machine tool for processing workpieces by means of tools or a laser, in the case of which the following steps are performed:

clamping a object to be clamped, more particularly a tool or a workpiece, on a clamping face of a clamping device, measurement of engagement of a face of the clamped object on the clamping face or of any gap between the face of the clamped object and the clamping face using a sensor device, comprising detection of an electrical and/or magnetic stimulation field extending between the face of the clamped object and the clamping face using at least one engagement sensor placed laterally of the clamping face with a measurement range aligned in the direction of the gap or of the clamping face, the measurement range extending essentially along the clamped object in accordance with a depth direction of any gap or parallel to the clamping face.

22. The method in accordance with claim 21 comprising moving the sensor device and/or clamping device during detection of the stimulation field.

* * * * *